March 10, 1959  E. J. CLARK  2,877,067
BEARING LUBRICATOR ASSEMBLY
Filed May 22, 1957  3 Sheets-Sheet 1

INVENTOR.
Earl J. Clark
BY
J. E. Ross
ATTORNEY

March 10, 1959  E. J. CLARK  2,877,067
BEARING LUBRICATOR ASSEMBLY
Filed May 22, 1957  3 Sheets-Sheet 2
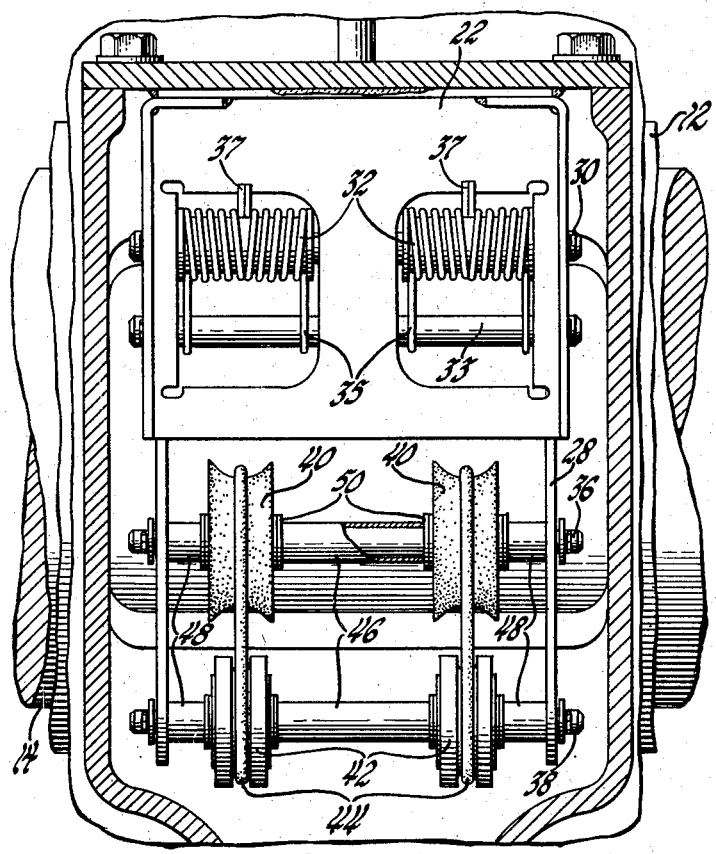
INVENTOR.
Earl J. Clark
BY
ATTORNEY March 10, 1959  E. J. CLARK  2,877,067
BEARING LUBRICATOR ASSEMBLY
Filed May 22, 1957  3 Sheets-Sheet 3

INVENTOR.
Earl J. Clark
BY
ATTORNEY

United States Patent Office 2,877,067
Patented Mar. 10, 1959

2,877,067

BEARING LUBRICATOR ASSEMBLY

Earl J. Clark, Indianapolis, Ind., assignor to General Motors Corporation, Detroit, Mich., a corporation of Delaware Application May 22, 1957, Serial No. 660,910

3 Claims. (Cl. 308—127)

This invention relates to a lubricator for a bearing and more particularly to a roller lubricator designed to improve the lubrication of a locomotive traction motor support bearing.

In order to decrease the amount of friction between a rotating axle and its supporting bearing and thereby reduce wear of these parts, it is desirable to provide an adequate supply of lubricant therebetween. The frictional resistance to rotation of the axle in a locomotive traction motor support bearing is unusually high due to the extremely heavy loads imposed thereon. It is therefore advantageous to provide such support bearings with an especially efficient form of lubrication by means of which a sufficient volume of lubricant is provided to effectively minimize wear of the bearing. Superior traction motor support bearing performance, therefore, can be insured by employing a lubricator which has a high rate of oil delivery.

Traction motor support bearings have been conventionally lubricated by means of wick-type applicators which are suspended in oil reservoirs adjacent the bearings. The lubricant is applied to the rotating axle by contact of the oil-saturated wick with the axle through an aperture in the support bearing. However, since all of the oil applied to the rotating axle is transported up from the reservoir to the axle by absorption through the wick, only a relatively small quantity of oil can be supplied. The rate of oil delivery by the wick-type applicator is frequently inadequate to insure best bearing performance, and this is particularly true when the oil level in the reservoir is low.

Among the objects of this invention are the following: to provide a roller lubricator designed to improve the lubrication of a locomotive traction motor support bearing; to provide considerably greater quantities of lubricating oil to a traction motor support bearing than is presently furnished by a wick-type applicator; and to provide a lubricator for traction motor support bearings having a high rate of oil delivery, particularly at low oil levels in the reservoir.

Briefly, the invention comprehends a traction motor support bearing lubricator mounted in a housing which has therein a bearing liner rotatably supporting a wheeled axle and an oil reservoir adjacent the bearing. The bearing liner has an aperture which exposes the circumferential surface of the axle to the reservoir. A frame member is secured to the upper wall of the housing within the reservoir, and pivotally mounted thereon are angular spring-loaded lever arms depending into a liquid lubricant contained in the reservoir. Two pairs of cylindrical rollers are rotatably mounted in general radial alignment on the lever arms and are positioned thereon so that one roller of each pair contacts the liquid in the reservoir and the other roller contacts the cylindrical surface of the axle exposed in the bearing aperture. A drive belt encircling the rollers is actuated by coaction of the axle-contacting roller with the rotating axle through the bearing aperture. Movement of the belt encircling the rollers conveys oil up from the reservoir and sprays it as a film onto the axle surface.

Other objects and advantages and features of the present invention will appear more clearly from the following description of a preferred embodiment thereof and from the drawings, in which:

Figure 2 is a fragmentary sectional view along the line 2—2 of Figure 1;

Figure 3 is an enlarged sectional view of one of the upper rollers of the lubricator shown in Figure 2;

Figure 4 is a sectional view of a modification of the roller shown in Figure 3;

Figure 5 is a fragmentary view of a modification of the lubricator shown in Figure 2;

Figure 6 is a sectional view along the line 6—6 of Figure 5;

Figure 1:
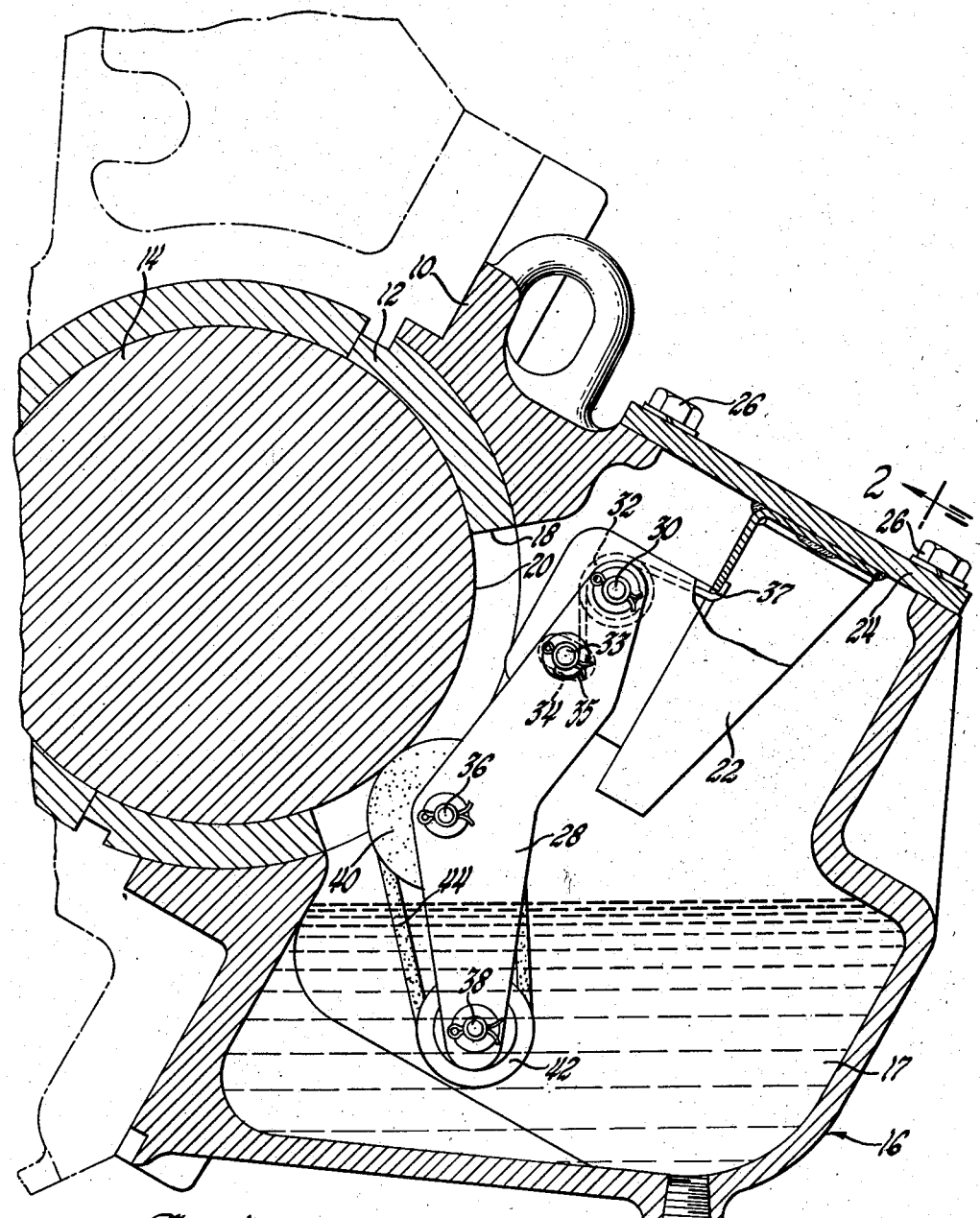
Figure 1 is a transverse vertical sectional view of a motor suspension bearing assembly and the axle which it supports.

Referring more particularly to the drawings, the embodiment of the invention shown in Figures 1 through 3 comprises a support bearing housing 10 having a reservoir 16 containing a liquid lubricant 17, such as oil. Supported in the housing is a bearing sleeve 12 which carries an axle 14 for a locomotive or the like. The bearing sleeve has an aperture 18 for exposing the cylindrical surface 20 of the axle.

A cover plate 24 is secured over the opening in the housing above the reservoir 16 by means of machine screws 26 or other appropriate means. A metal frame member or bracket 22 projects downwardly from the cover plate and is welded or otherwise rigidly affixed thereto. Supported by the frame 22 is a rod 30 extending parallel with the axle 14 and around which two torsion springs 32 are disposed. Angular lever arms 28, which project downwardly into the lubricant 17 in the reservoir, are pivotally mounted on the rod 30 and are urged toward the axle by the torsion springs 32. As shown in Figures 1 and 2, the lower ends 35 of these springs engage a horizontally extending rod 33, which is supported by the lever arms 28, while the opposite ends 37 of the springs project radially to engage an edge of the bracket 22. The rod 33 extends through a slot 34 in the bracket, thereby restricting the pivotal movement of the lever arms to a small arc.

Supported by the lever arms 28 are generally horizontal upper and lower shafts 36 and 38, respectively. A pair of laterally spaced cylindrical rollers 40 are rotatably mounted on the upper shaft, and a second pair of cylindrical rollers 42 are similarly mounted on the lower shaft in generally radial alignment with the rollers 40. An elastic belt 44, preferably made from oil-resistant rubber, encircles each radially aligned pair of upper and lower rollers.

The shaft 36 is located in such position that movement of the lever arms brings the upper rollers 40 into contact with the axle surface 20 exposed by the bearing aperture 18. The lever arms, being spring loaded, urge the upper rollers 40 against the surface of the axle 14. Rotation of the axle therefore causes opposite rotation of the upper or drive rollers 40 and movement of the belt 44 which encircles them. As hereinbefore indicated, the lower extremities of the lever arms 28 supporting the lower rollers 42 extend into the lubricant in the reservoir. Hence, the lower rollers 42 disposed at these ends, as well as the belts 44 which the rollers carry, are in direct contact with the lubricant.

As each belt moves through the lubricant in the reservoir, it retains quantities of oil on its surface. The oil is thrown from the belt by centrifugal force as the belt is carried around the upper drive roller and is thus sprayed as a thin film over the axle surface. As the speed of the axle increases, this rate of oil distribution is correspondingly increased, thereby supplying an exceptionally large quantity of oil to the rapidly rotating axle surface. The amount of oil which can be applied to the axle by this lubricator is over 100 times greater than the amount which can be applied by a wick-type lubricator. The quantity of oil supplied by the apparatus described herein, even at extremely low levels of reservoir lubricant, is considerably greater than the quantity supplied by conventional wick-type lubricators having high lubricant levels in the reservoir.

Figure 2 more clearly shows the manner in which the torsion springs 32 cooperate with the frame member 22 and the rods 30 and 33, thereby providing the desirable spring loading of the lever arms 28. The lateral disposition of the cylindrical rollers on the shafts, as shown in Figure 2, is maintained by means of suitable spacers 46 and 48 in conjunction with thrust washers 50. The lateral disposition of the rollers on the shafts is determined by the extension and location of the bearing aperture or apertures. If, for example, a smaller aperture is employed to increase the load-carrying area of the bearing, the rollers can be correspondingly spaced closer to one another.

The composition of the rollers may be of any suitable oil-resistant material such as felt, neoprene or nylon. The employment of felt or neoprene for the drive rollers is more desirable than nylon to effectively drive the belts due to the extremely low frictional qualities of nylon. The employment of nylon, however, for the carrier rollers on the lower shaft 38 is particularly satisfactory. Nylon forms its own bearing surface and therefore eliminates the need for a bushing insert on the inner diameter of the roller, thereby simplying its manufacture.

Figure 3 and 4 illustrate two highly satisfactory types of drive rollers. The outer circumferential surface 51 of the cylindrical roller shown in Figure 3 is concave or recessed to permit the belt 44 to encircle the roller without directly contacting the axle surface. This construction not only permits a more uniform dispersal of the oil over the axle surface but also provides a means to securely retain the belt on the roller. The outer portion 52 of the roller, being made preferably of an annular ring of neoprene, has satisfactory driving qualities. However, since neoprene has poor bearing properties, a bushing 54, which can be of any suitable bearing material, preferably nylon, is inserted into the inner diameter of the roller to provide the necessary axial bearing surface.

Figure 4 illustrates another embodiment of the upper roller 40 in which the outer portion 56 is made of an annular ring of felt. The outer circumferential surface of the felt ring 56 has a groove 57 which not only serves to retain the belt on the roller but also permits a more uniform dispersal of oil by the felt roller. The annular felt ring 56 is secured to an inner bushing member 58 by means of metal washers 60 and metal tubes 62 which are expanded at each end outside the washer to retain the latter in position. The bushing 58 in this modification also may be of any suitable bearing material, preferably nylon.

For many applications it may be more desirable to employ the felt drive rollers which, although not as durable or inexpensive as neoprene rollers, are advantageous in other respects. For example, felt possesses superior frictional properties, which is desirable for effective belt driving performance, as well as outstanding oil absorption characteristics. Oil retained in the felt ring provides a limited emergency lubrication if the belt action should fail or the reservoir become devoid of lubricant.

Under abnormal conditions of use, the drive belts may undergo a partial loss in elasticity. To adapt the lubricator to such abnormal conditions, the device shown in Figures 5 and 6 may be employed to compensate for loss in elasticity. In this modification, the roller shafts 36 and 38 are connected by a suitable spring means, such as a flat leaf spring 64, which may partially or entirely replace the central spacer 46. The lower end of the lever arm 28' is provided with a generally vertical slot 65 in which the roller shaft 38 is positioned, thereby permitting transverse movement of the shaft. Use of such a spring means allows a predetermined amount of tension to be applied to the belts and this tension remains generally constant due to expansion of the spring as the belt stretching occurs. Normally, however, it is preferable to employ the lubricator without the leaf spring construction since the excess tension imposed on the belts thereby reduces the free movement of the belts and consequently their rate of oil delivery.

Figure 7:
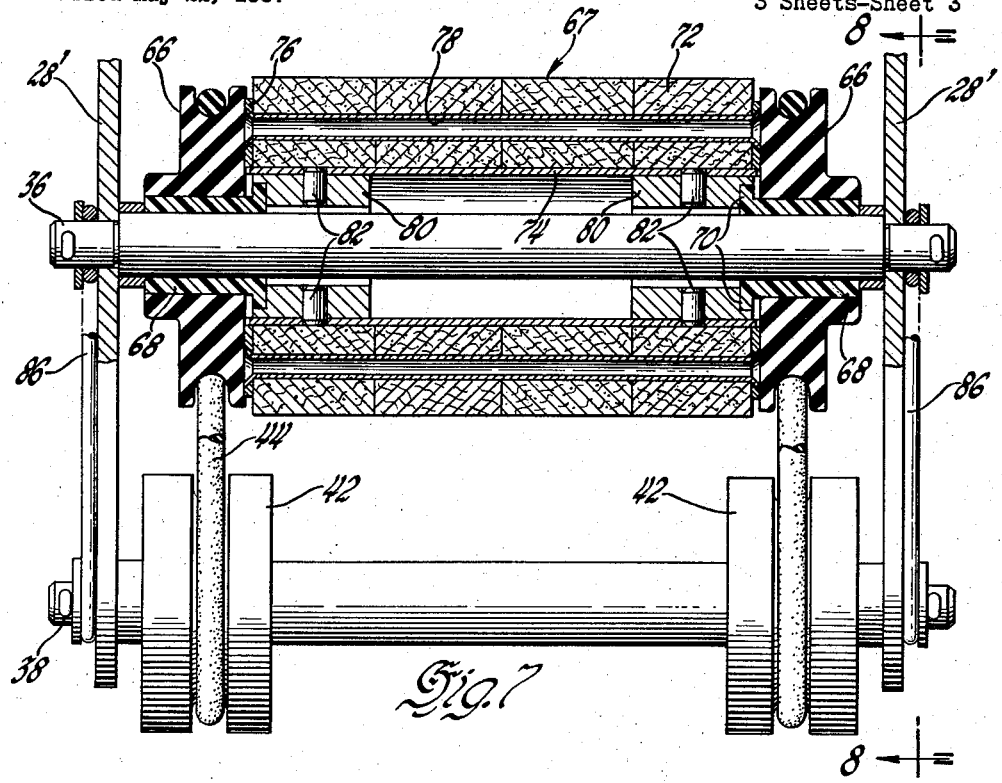
Figure 7 is an enlarged fragmentary view, partially in section, of a modification of the lubricator shown in Figure 2.
Figure 8:
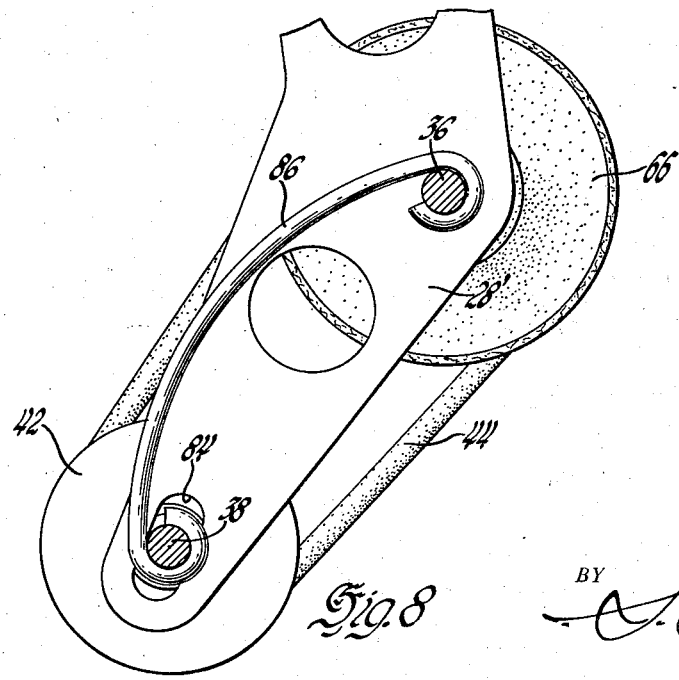
Figure 8 is a sectional view along the line 8—8 of Figure 7.

A single wide cylindrical drive roller assembly is employed in the modification of the invention shown in Figures 7 and 8. The roller comprises a wide, felt-covered cylinder 67 which is supported by cylindrical neoprene drive rollers 66 at each end. Each neoprene roller has a nylon bushing 68 located in its central opening, thereby providing an axial bearing surface similar to that of the roller shown in Figure 3. However, this bushing is adapted with suitable tangs 70 which function as a support for the central felt roller 67.

This roller comprises four annular felt rings 72 surrounding an inner cylindrical metal drum 74. The felt rings 72 are held in place by means of metal washers 76 at each end of the drum. The metal washers are, in turn, retained by tubular members 78 which are expanded at each end beyond the metal washers. Secured to the inner periphery of each end of the drum 74 by means of radially extending pins 82 are drive bushings 80 containing grooves in their outer lateral surface into which are fitted the tangs 70 of the bushings 68. Neither the cylindrical member nor the drive bushings 80 contact the surface of the shaft 36 but are supported entirely by the tangs 70 of the rollers 66.

As noted previously, under abnormal conditions causing excessive drive belt wear, it may be advantageous to employ a spring means between the two shafts 36 and 38 to compensate for belt stretching. With this embodiment of the invention, constant tension of the belts can be maintained preferably by mounting the lower shaft 38 in a generally vertical slot 84 in the lower end of the lever arm 28' to permit transverse movement of the shaft. Suitable wire springs 86 of generally circular cross section, which connect the shafts 36 and 38, can be disposed at each end of the shafts, preferably one at each outer side of the lever arm.

The employment of the wide cylindrical felt roller in the lubricator facilities equal distribution of lubricant throughout the bearing surface, and in addition the felt roller serves also as a rolling wick when the lubricator is used at slow speeds or if the belt action should ever fail.

Although the means to resiliency mount the lower shaft of the lubricator shown in Figures 5 and 6 is a leaf spring, it is understood that wire springs generally similar to those shown in Figures 7 and 8 may be used rather than the leaf spring. In such instances suitable spacers generally similar to the spacers 46 and 48 shown in Figure 2 may be employed.

While the present invention has been illustrated with certain specific embodiments therof, it is not intended that the scope of the invention be limited thereby except as defined by the appended claims.

I claim:
1. A bearing lubricator comprising a frame having an arm thereon, a pair of parallel shafts mounted for movement relative to each other on said arm while maintaining said parallel relationship, a roller on each of said shafts, a drive belt connecting said rollers, movement of said belt being provided by at least one of said rollers coacting with a rotating member through an aperture in a bearing, and spring means mounted between said shafts tending to bias them apart and tension said belt.

2. A self-lubricating bearing assembly comprising a housing, a bearing having an aperture therein mounted in said housing, an axle rotatably supported by said bearing, a reservoir within said housing for containing a liquid lubricant for said bearing, a frame secured to said housing, an arm supported by said frame having a slot therein, a first shaft mounted on said arm, a second shaft mounted on said arm in said slot parallel to said first shaft for movement in said slot relative thereto, a roller on each of said shafts, one of said rollers contacting said axle through said aperture in said bearing, the other of said rollers extending into said reservoir and adapted to contact lubricating oil in said reservoir, a belt encircling said rollers so that rotation of the roller which contacts said axle rotates said roller in said reservoir for conveying the lubricant on said belt to said axle, and spring means mounted between said shafts tending to bias them apart and tension said belt.

3. A self-lubricating bearing assembly comprising a metal housing, a bearing having an aperture therein mounted in said housing, an axle rotatably supported by said bearing, a reservoir within said housing for containing a liquid lubricant for said bearing, a metal frame secured to said housing, a lever arm pivotally supported by said frame, generally parallel upper and lower shafts directly supported by said lever arm for movement away from each other, a roller rotatably mounted on said shafts, a felt-covered cylindrical member drivingly supported by the roller on said upper shaft, said felt-covered cylindrical member contacting said axle through said aperture in said bearing, the roller on said lower shaft extending into said reservoir and adapted to contact lubricating oil in said reservoir, a belt encircling said rollers so that rotation of said cylindrical member which contacts said axle rotates said roller in said reservoir conveying the lubricant on said belt to said axle, and spring means operably connected to said frame and said lever arm to maintain said axle-contacting roller in abutment with said axle, and spring means mounted between said shafts tending to bias them apart and tension said belt.

References Cited in the file of this patent

UNITED STATES PATENTS

| | | |
|---|---|---|
| 323,605 | Sterling et al. | Aug. 4, 1885 |
| 2,640,744 | Harkenrider | June 2, 1953 |
| 2,731,307 | Arblaster | Jan. 17, 1956 |

FOREIGN PATENTS

| | | |
|---|---|---|
| 433,109 | Germany | Aug. 20, 1926 |